(12) United States Patent
Serizawa et al.

(10) Patent No.: US 8,779,042 B2
(45) Date of Patent: Jul. 15, 2014

(54) FLAME-RETARDANT POLYLACTIC ACID BASED RESIN COMPOSITION, MOLDED ARTICLE THEREOF AND METHOD FOR PRODUCING MOLDED ARTICLE

(75) Inventors: Shin Serizawa, Tokyo (JP); Yukihiro Kiuchi, Tokyo (JP); Masatoshi Iji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/636,707

(22) PCT Filed: Jan. 24, 2011

(86) PCT No.: PCT/JP2011/051193
§ 371 (c)(1),
(2), (4) Date: Sep. 24, 2012

(87) PCT Pub. No.: WO2011/122080
PCT Pub. Date: Oct. 6, 2011

(65) Prior Publication Data
US 2013/0012631 A1    Jan. 10, 2013

(30) Foreign Application Priority Data
Mar. 30, 2010   (JP) ................. 2010-077915

(51) Int. Cl.
*B29C 43/00* (2006.01)
*B29C 45/00* (2006.01)
*C08L 67/00* (2006.01)
*C08K 7/14* (2006.01)
*C08K 13/04* (2006.01)
*C08K 5/53* (2006.01)
*C08K 5/29* (2006.01)

(52) U.S. Cl.
USPC ............. 524/195; 524/135; 264/331.11

(58) Field of Classification Search
USPC ................. 524/135, 195; 264/331.11
See application file for complete search history.

(56) References Cited

U.S. PATENT DOCUMENTS

| | | | |
|---|---|---|---|
| 7,435,769 B2 | 10/2008 | Kishimoto et al. | |
| 2006/0247343 A1 | 11/2006 | Kishimoto et al. | |

FOREIGN PATENT DOCUMENTS

| | | | |
|---|---|---|---|
| CN | 1761721 | | 4/2006 |
| JP | 2001-192565 | | 7/2001 |
| JP | 2002-069313 | | 3/2002 |
| JP | 2002-114981 | | 4/2002 |
| JP | 2002-179887 | | 6/2002 |
| JP | 2002-275473 | | 9/2002 |
| JP | 2002-309070 | | 10/2002 |
| JP | 2003-128900 | | 5/2003 |
| JP | 2005-162871 | | 6/2005 |
| JP | 2005-306975 | | 11/2005 |
| JP | 2005-306975 A | * | 11/2005 |
| JP | 2008-019294 | | 1/2008 |
| JP | 2009-249532 | | 10/2009 |
| JP | 2009-270089 | | 11/2009 |
| JP | 2009-270089 A | * | 11/2009 |
| JP | 2009270089 A | * | 11/2009 |
| JP | 2010-006869 | | 1/2010 |
| JP | 2010-024430 | | 2/2010 |
| JP | 2010-037438 | | 2/2010 |
| WO | 2004022650 | | 3/2004 |
| WO | 2009130904 | | 10/2009 |
| WO | 2010004799 | | 1/2010 |

OTHER PUBLICATIONS

JP2005-306975A—machine translation.*
JP2009-270089A—machine translation.*
International Search Report PCT/JP2011/051193 dated Apr. 5, 2011, with English translation.
Chinese Official Action—201180018032.9—Oct. 29, 2013.

* cited by examiner

*Primary Examiner* — Ling-Siu Choi
*Assistant Examiner* — Ronald Grinsted
(74) *Attorney, Agent, or Firm* — Young & Thompson

(57) ABSTRACT

A polylactic acid based resin composition includes a polylactic acid based resin (A), a flame retardant (B) and a carbodiimide compound (C), the flame retardant (B) including at least a phosphorus compound (b1) having a phosphaphenanthrene skeleton and a hydroxy group, and the carbodiimide compound (C) including at least an aliphatic carbodiimide.

18 Claims, No Drawings

FLAME-RETARDANT POLYLACTIC ACID BASED RESIN COMPOSITION, MOLDED ARTICLE THEREOF AND METHOD FOR PRODUCING MOLDED ARTICLE

TECHNICAL FIELD

The present invention relates to a flame-retardant polylactic acid based resin, a molded article thereof and a method for producing the molded article.

BACKGROUND ART

Recently, from the apprehension of the depletion of petroleum resources and from the viewpoint of the environmental preservation, resins made of plant-derived raw materials have been attracting attention. Among the resins made of plant-derived raw materials, polylactic acid is relatively satisfactory in heat resistance and strength, and allows mass production, and hence has been applied to various applications such as applications to packaging containers, agricultural films and housings of electric/electronic appliances.

However, polylactic acid resin is flammable, and hence when polylactic acid resin is used in applications requiring high-degree of flame retardancy such as applications to housings of electrical household appliances and OA appliances and automobile components, countermeasures for flame retardation are required. As a general method for flame retardation, it is possible to adopt a method in which a halogen-based flame retardant such as a bromine compound high in flame retardation effect is mixed in the resin. However, halogen-based flame retardants sometimes generate halogen-derived gases at the time of burning, and accordingly, it becomes necessary to cope with the exhaust gases and the work environment associated with the incineration of waste and the thermal recycle.

As flame retardation techniques involving flame retardants other than halogen-based flame retardants, metal hydroxide-based flame retardants and phosphorus-based flame retardants are added to resins.

Patent Literature 1 describes the addition of a metal hydroxide (aluminum hydroxide) and a phosphorus-containing compound(s) (triphenyl phosphate and/or a phosphinic acid salt), as a flame retardation technique for polymer compounds having biodegradability such as polylactic acid.

Patent Literature 2 describes compositions of synthetic resins (ABS resin, polyethylene terephthalate resin and epoxy resin) that contain a phosphorus compound having a phosphaphenanthrene skeleton, although no flame retardant effect of Examples is described.

Patent Literature 3 describes a phosphorus compound having a phosphaphenanthrene skeleton as a flameproofing agent for polyester fiber.

Patent Literature 4 describes a flame-retardant resin composition that contains a styrene-based resin (ABS, HIPS (impact resistant polystyrene) and a phosphorus compound having a phosphaphenanthrene skeleton.

CITATION LIST

Patent Literature

Patent Literature 1: JP2005-162871A
Patent Literature 2: JP2002-69313A
Patent Literature 3: JP2002-275473A
Patent Literature 4: JP2001-192565A

SUMMARY OF INVENTION

Technical Problem

However, the metal hydroxides and the phosphorus compounds described in Patent Literature 1 and the phosphorus compounds having a phosphaphenanthrene skeleton described in Patent Literature 2 to Patent Literature 4 involve some problems when used as the flame retardants for polylactic acid.

A first problem is a possibility that the practical properties such as fluidity of the polylactic acid based resin composition are degraded when a metal hydroxide is used as a flame retardant. The reason for this possibility is such that when only a metal hydroxide is used as a flame retardant, for the purpose of obtaining a sufficient flame retardant effect, the metal hydroxide such as aluminum hydroxide, degrading the fluidity of the resin, is required to be added in a large amount.

A second problem is a possibility that when a phosphorus compound is used as a flame retardant, no high degree of flame retardant effect is obtained. The reason for this possibility is ascribable to the flame retardation mechanism of such a phosphorus compound. A phosphorus compound such as a phosphoric acid ester forms a flame-retardant nonflammable coating film at the time of burning when added to an easily carbonizable synthetic resin such as polycarbonate resin, but hardly forms a nonflammable coating film when added to polylactic acid because polylactic acid is very flammable. In particular, only the addition of a phosphorus compound having a phosphaphenanthrene skeleton to polylactic acid cannot be said to result in sufficient flame retardant effect because the self-extinguishing time is long and the dripping (drip) of molten matter tends to occur.

A third problem is such that a resin composition including a phosphorus compound added thereto as a flame retardant tends to cause bleed (exudation of additives from the composition) in a storage at a high temperature and a high humidity or in a long-term storage, in other words, is poor in bleed resistance. In particular, a phosphoric acid ester having a function as a plasticizer and a phosphorus compound having a phosphaphenanthrene skeleton that contains no hydroxy group are decreased in solubility in polylactic acid at a high temperature and a high humidity, for example, at 60° C. and 95% RH, and tend to precipitate on the surface of the resin composition.

A fourth problem is a possibility that the physical properties intrinsic to polylactic acid are degraded when a phosphorus compound is used as a flame retardant. In particular, when a phosphorus compound having a hydroxy group and a phosphaphenanthrene skeleton is used, a resin composition to which the phosphorus compound is added is excellent in bleed resistance at a high temperature and a high humidity, but the transesterification reaction of the polylactic acid is promoted at the time of heat-kneading in the production of the resin composition, and thus the molecular weight of the polylactic acid tends to be remarkably decreased.

An object of the present invention is to provide a polylactic acid based resin composition superior in flame retardancy and bleed resistance at a high temperature and a high humidity and a molded article made of the polylactic acid based resin composition.

Solution to Problem

According to an aspect of the present invention, provided is a flame-retardant polylactic acid based resin composition including:

100 parts by mass of a polylactic acid based resin (A);
30 to 300 parts by mass of a flame retardant (B);
0.1 to 20 parts by mass of a carbodiimide compound (C);
0 to 100 parts by mass of fiber; and
0 to 5 parts by mass of a fluorine-containing resin,
wherein the flame retardant (B) includes one or two or more components selected from the group consisting of a phosphorus compound (b1) having a phosphaphenanthrene skeleton and a hydroxy group, a phosphazene compound (b2) and a metal hydroxide (b3), the flame retardant (B) including at least 1 part by mass or more of the phosphorus compound (b1); and the carbodiimide compound (C) includes at least 0.1 part by mass or more of an aliphatic carbodiimide.

According to another aspect of the present invention, provided is a molded article obtained by molding the flame-retardant polylactic acid based resin composition.

According to yet another aspect of the present invention, provided is a method for producing a molded article of a flame-retardant polylactic acid based resin composition, including:

melt-kneading a mixture including a polylactic acid based resin (A), a flame retardant (B) including a phosphorus compound (b1) having a phosphaphenanthrene skeleton and a hydroxy group, and a carbodiimide compound (C) to form a molten matter; and filling the molten matter in a mold and maintaining a temperature equal to or higher than the glass transition temperature of the polylactic acid based resin (A) and equal to or lower than the melting point of the polylactic acid based resin—20° C. to form a molded article, or after filling the molten matter in the mold and cooling to a temperature lower than the glass transition temperature to form a molded article, heat-treating the molded article at a temperature equal to or higher than the glass transition temperature and equal to or lower than the melting point—20° C.

Advantageous Effect of Invention

According to the present invention, it is possible to provide a polylactic acid based resin composition superior in flame retardancy and bleed resistance at a high temperature and a high humidity, and a molded article of the polylactic acid based resin composition.

DESCRIPTION OF EMBODIMENTS

A flame-retardant polylactic acid based resin composition according to an exemplary embodiment of the present invention includes 100 parts by mass of a polylactic acid based resin (A), a 30 to 300 parts by mass of a flame retardant (B) and 0.1 to 20 parts by mass of a carbodiimide compound (C). The flame retardant (B) includes one or two or more components selected from the group consisting of a phosphorus compound (b1) having a phosphaphenanthrene skeleton and a hydroxy group, a phosphazene compound (b2) and a metal hydroxide (b3), and includes at least 1 part by mass or more of the phosphorus compound (b1). The carbodiimide compound (C) includes at least 0.1 part by mass or more of an aliphatic carbodiimide. The resin composition may also include 100 parts by mass or less of fiber, and may also include 5 parts by mass or less of a fluorine-containing resin.

The resin composition preferably includes 1 to 30 parts by mass of the phosphazene compound (b2) as the flame retardant (B).

The resin composition preferably includes 10 parts by mass or more of the metal hydroxide (b3) as the flame retardant (B).

The aliphatic carbodiimide is preferably an aliphatic polycarbodiimide, and more preferably an aliphatic polycarbodiimide having an alicyclic structure.

The resin composition preferably includes 0.1 parts by mass or more of an aromatic carbodiimide as the carbodiimide compound (C), and the aromatic carbodiimide is preferably an aromatic polycarbodiimide.

When the resin composition includes the phosphazene compound (b2), the resin composition preferably includes a cyclophosphazene compound, and the cyclophosphazene compound preferably has a substituted or an unsubstituted phenoxy group.

When the resin composition includes the metal hydroxide (b3), the resin composition preferably includes aluminum hydroxide.

Hereinafter, the exemplary embodiment is described in detail.

[Polylactic Acid Based Resin (A)]

As the polylactic acid based resin (A) in the exemplary embodiment, poly(L-lactic acid), poly(D-lactic acid), mixtures of these, and copolymers of L-lactic acid and D-lactic acid can be used. Usable examples of the polylactic acid based resin (A) include: a polylactic acid based resin including 20 to 100 mol % of either unit of L-lactic acid and D-lactic acid and 0 to 8 mol % of the unit of the antipode lactic acid of the foregoing lactic acid; and preferably a polylactic acid based resin including 80 to 100 mol % of any unit of L-lactic acid and D-lactic acid and 0 to 20 mol % of the unit of the antipode lactic acid of the foregoing lactic acid.

The polylactic acid based resin may be a copolymer between lactic acid and another monomer such as a hydroxycarboxylic acid; the copolymer includes the lactic acid unit in a content of preferably 85 mol % or more, more preferably 90 mol % or more and furthermore preferably 95 mol % or more.

The polylactic acid based resin can be obtained as follows: the monomers complying with the intended structure are selected from L-lactic acid, D-lactic acid and other monomers such as hydroxycarboxylic acids, the selected monomers are used as the raw materials and the raw materials are subjected to dehydration polycondensation. Preferably, the polylactic acid based resin can be obtained as follows: the compounds complying with the intended structure are selected, for example, from the cyclic dimer of lactic acid, namely lactide, the cyclic dimer of glycolic acid, namely glycolide, and caprolactone, and the thus selected compounds are subjected to ring-opening polymerization. Examples of lactide include the cyclic dimer of L-lactic acid, namely L-lactide, the cyclic dimer of D-lactic acid, namely D-lactide, the cyclic dimer between D-lactic acid and L-lactic acid, namely meso-lactide, and the racemic mixture between D-lactide and L-lactide, namely DL-lactide. In the exemplary embodiment, any one of the foregoing lactides can be used. However, as the main raw materials, D-lactide or L-lactide is preferable.

From the viewpoint of heat resistance, in the polylactic acid based resin, the ratio between the crystalline polylactic acid (I) having an optical purity of 90% or more and the polylactic acid (II) having an optical purity of less than 90%, in terms of the mass ratio (I/II), is preferably 100/0 to 10/90, more preferably 100/0 to 25/75, furthermore preferably 100/0 to 50/50 and particularly preferably 100/0 to 90/10.

Examples of commercially available polylactic acid resins include: Terramac (trade name) manufactured by Unitika Ltd.; Lacea (trade name) manufactured by Mitsui Chemicals, Inc.; and Nature Works (trade name) manufactured by NatureWorks LLC.

Among these polylactic acid based resins, from the viewpoint of the crystallization rate and physical properties, preferable is a polylactic acid based resin which is a high-purity L-lactic acid product of crystal grade, in particular, a polylactic acid having an L-lactic acid purity of 95 mol % or more.

Examples of other monomers to be copolymerized with lactic acid, which is the main constituent component of the polylactic acid based resin are described. Examples of such monomers as acid components include: aromatic dicarboxylic acids such as terephthalic acid, isophthalic acid, orthophthalic acid, 2,6-naphthalenedicarboxylic acid, 2,5-naphthalenedicarboxylic acid, 2,7-naphthalenedicarboxylic acid, 1,5-naphthalenedicarboxylic acid, methylterephthalic acid, 4,4'-biphenyldicarboxylic acid, 2,2'-biphenyldicarboxylic acid, 4,4'-biphenylether dicarboxylic acid, 4,4'-diphenylmethanedicarboxylic acid, 4,4'-diphenylsulfonedicarboxylic acid and 4,4'-diphenylisopropylidenedicarboxylic acid; saturated aliphatic dicarboxylic acids such as adipic acid, sebacic acid, oxalic acid, malonic acid, succinic acid, azelaic acid, undecanedioic acid, dodecanedioic acid, icosanedioic acid and hydrogenated dimer acid; unsaturated aliphatic dicarboxylic acids such as fumaric acid, maleic acid, itaconic acid, mesaconic acid, citraconic acid and dimer acid, and the anhydrides of these; and alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid and tetrahydrophthalic acid. Examples of such monomers as diol components include: aliphatic diols such as ethylene glycol, propylene glycol, 1,3-butanediol, diethylene glycol, neopentyl glycol, 1,5-pentanediol, 1,6-hexanediol, 1,8-octanediol and 1,10-decanediol; alicyclic diols such as 1,4-cyclohexanedimethanol, 1,3-cyclohexanedimethanol and 1,2-cyclohexanedimethanol; bisphenols such as bisphenol A and bisphenol S or ethylene oxide adducts of the bisphenols; and aromatic diols such as hydroquinone and resorcinol. Examples of such monomers also include: hydroxycarboxylic acids such as p-hydroxybenzoic acid, p-(2-hydroxyethoxy)benzoic acid and 6-hydroxycaproic acid; and lactone compounds such as δ-valerolactone, γ-butyrolactone and ε-caprolactone. For the purpose of imparting flame retardancy, organic phosphorus compounds may also be copolymerized.

In such a small amount that does not impair the intended properties, other polyester resins may also be added to the polylactic acid based resin. Examples of such other polyester resins include: polyethylene terephthalate, polycarbonate, polyarylate, polycyclohexylene dimethylene terephthalate, polyethylene naphthalate, polybutylene naphthalate, polyethylene isophthalate/terephthalate, polybutylene isophthalate/terephthalate, polyethylene terephthalate/cyclohexylene dimethylene terephthalate, cyclohexylene dimethylene isophthalate/terephthalate, poly(p-hydroxybenzoic acid/ethylene terephthalate) and polytetramethylene terephthalate made of 1.3-propanediol, which is a plant-derived raw material.

[Phosphorus Compound (b1) Having Phosphaphenanthrene Skeleton and Hydroxy Group]

The phosphorus compound (b1) used in the exemplary embodiment has a phosphaphenanthrene skeleton and a hydroxy group.

As the phosphorus compound (b1), the compound represented by the following formula (1) can be used:

[Formula 1]

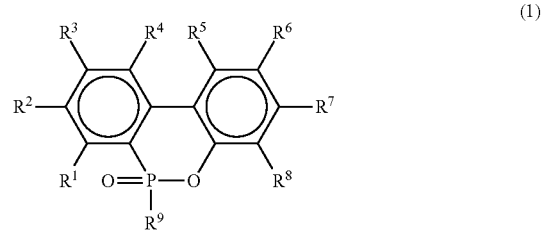

(1)

wherein in formula (1), $R^1$ to $R^9$ are each independently a hydrogen atom, a hydroxy group, an alkyl group, an alkenyl group, an aryl group or an aralkyl group, and at least one of $R^1$ to $R^9$ is a hydroxy group or a substituent having a hydroxy group.

As the alkyl group, an alkyl group having 1 to 10 carbon atoms is preferable; examples of such a preferable alkyl group include a methyl group, an ethyl group, a propyl group (n-propyl group or isopropyl group), a butyl group (n-butyl group, isobutyl group, sec-butyl group or tert-butyl group), a linear or branched pentyl group and cycloalkyl groups such as a cyclohexyl group.

As the alkenyl group, an alkenyl group having 2 to 10 carbon atoms is preferable; examples of such a preferable alkenyl group include: a vinyl group, an allyl group, a butenyl group, a hexenyl group and an octenyl group.

As the aryl group, an aryl group having 6 to 10 carbon atoms is preferable; examples of such a preferable aryl group may include a phenyl group, a tolyl group, a xylyl group, a biphenyl group and a naphthyl group.

As the aralkyl group, an aralkyl group having 7 to 10 carbon atoms is preferable; examples of such a preferable aralkyl group include the foregoing alkyl groups substituted with the foregoing aryl groups.

It is possible to preferably use the phosphorus compound represented by formula (1) in which $R^1$ to $R^8$ are each a hydrogen atom, and $R^9$ is an aryl group having a hydroxy group.

As such a phosphorus compound, the phosphorus compound (9,10-dihydro-10-(2,5-dihydroxyphenyl)-9-oxa-10-phosphaphenanthrene-10-oxide) represented by the following formula (2) is preferable:

[Formula 2]

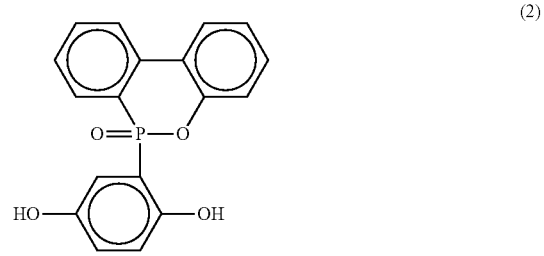

(2)

The polylactic acid based resin composition to which such a phosphorus compound (b1) having a phosphaphenanthrene skeleton and a hydroxyl group is added is imparted with flame retardancy and is also excellent in bleed resistance at a high temperature and a high humidity. In contrast to this, a polylactic acid based resin to which a phosphorus compound having a phosphaphenanthrene skeleton but having no group such as 9,10-dihydro-10-benzyl-9-oxa-10-phosphaphenanthrene-10-oxide ($R^1$ to $R^8$ are each a hydrogen atom and $R^9$ is a benzyl group) or 9,10-dihydro-9-oxa-10-phosphaphenanthrene-10-oxide ($R^1$ to $R^9$ are each a hydrogen atom) is added undergoes the occurrence of bleeding at a high temperature and a high humidity.

The phosphorus compound (b1) has a plasticization effect and hence can improve, in particular, the fluidity of the resin composition to which a metal hydroxide (D) is added. In particular, 9,10-dihydro-10-(2,5-dihydroxyphenyl)-9-oxa-10-phosphaphenanthrene-10-oxide can be partially dissolved in polylactic acid, and hence can further improve the fluidity of the resin composition.

When only the phosphorus compound (b1) is used as the flame retardant (B), the mixing amount of the phosphorus compound (b1) is preferably 30 parts by mass or more in relation to 100 parts by mass of the polylactic acid based resin (A); when the phosphorus compound (b1), and the phosphazene compound (b2) and/or the metal hydroxide (b3) are used in combination as the flame retardant (B), the total amount of the component b1, the component b2 and the component b3 is preferably 30 parts by mass or more in relation to 100 parts by mass of the polylactic acid based resin, and in this case, the content of the phosphorus compound (b1) is preferably 1 part by mass or more, more preferably 3 parts by mass or more and furthermore preferably 5 parts by mass or more.

On the other hand, from the viewpoints of the bleed resistance, the physical properties of the resin, the production cost and others, the upper limit of the mixing amount of the flame retardant (B), namely, the total amount of the component b1, the component b2 and the component b3 can be set to be 300 parts by mass or less, is preferably 200 parts by mass and more preferably 150 parts by mass or less; even when the upper limit is 100 parts by mass or less, a high flame retardant effect can be obtained. The content of the phosphorus compound (b1) can be set to be 150 parts by mass or less, and is preferably 100 parts by mass or less and more preferably 90 parts by mass or less; even when the content of the phosphorus compound (b1) is 50 parts by mass or less, a high flame retardant effect can be obtained.

[Carbodiimide Compound (C)]

The carbodiimide compound (C) used in the exemplary embodiment of the present invention includes at least an aliphatic carbodiimide. It is preferable to use this aliphatic carbodiimide and an aromatic carbodiimide in combination. Here, the aliphatic carbodiimide means a carbodiimide compound other than the aromatic carbodiimide, and includes aliphatic carbodiimides having an alicyclic structure such as a cyclohexane ring.

The carbodiimide compound (C) is a compound having in the molecule thereof at least a carbodiimide group (—N=C=N—), and as a carbodiimide compound having one carbodiimide group (monocarbodiimide), a compound represented by the following general formula can be used:

$$R^1—N=C=N—R^2 \quad \text{[Formula 3]}$$

wherein in the formula, $R^1$ and $R^2$ each represent an organic group, and $R^1$ and $R^2$ may be the same as or different from each other. Examples of such a monocarbodiimide include dicyclohexylcarbodiimide, diisopropylcarbodiimide, diphenylcarbodiimide, bis(methylphenyl)carbodiimide, bis(methoxyphenyl)carbodiimide, bis(nitrophenyl)carbodiimide, bis(dimethylphenyl)carbodiimide, bis(diisopropyl) carbodiimide, bis(t-butyl)carbodiimide, N-ethyl-N'-(3-dimethylaminopropyl)carbodiimide, bis(triphenylsilyl)carbodiimide and N,N'-di-2,6-diisopropylphenylcarbodiimide. As a commercially available product of N,N'-di-2,6-diisopropylphenylcarbodiimide, Stabaxol I (trade name) manufactured by Rhein Chemie Corp. can be used.

Examples of a carbodiimide compound having two or more carbodiimide groups (polycarbodiimide) include a compound represented by the following general formula:

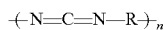 [Formula 4]

wherein in the formula, R represents an organic linking group, n represents an integer of 2 or more, and R may be the same or different among the structural units. In the formula, n preferably falls within a range from 2 to 50; for example, a polycarbodiimide with n falling within a range from 2 to 20 can be used; further, a polycarbodiimide with n falling within a range from 5 to 20 can be used.

Examples of such a polycarbodiimide include: aliphatic polycarbodiimide such as poly(4,4'-dicyclohexylmethane carbodiimide); and aromatic polycarbodiimides such as poly(4,4'-diphenylmethane carbodiimide), poly(p-phenylene carbodiimide), poly(m-phenylene carbodiimide), poly(methylphenylene carbodiimide), poly(diisopropylphenylene carbodiimide), poly(methyl-diisopropylphenylene carbodiimide), poly(1,3,5-triisopropylphenylene carbodiimide), poly(1,3,5-triisopropylphenylene and 1,5-diisopropylphenylene carbodiimide).

As the aliphatic polycarbodiimide, aliphatic polycarbodiimides having an alicyclic structure such as a cyclohexane ring are preferable. Examples of such an aliphatic polycarbodiimide include such polycarbodiimides that the organic linking group R in the foregoing general formula includes at least an alicyclic divalent group such as a cyclohexylene group. As such an aliphatic polycarbodiimide, poly(4,4'-dicyclohexylmethanecarbodiimide) can be preferably used. As a commercially available product of poly(4,4'-dicyclohexylmethanecarbodiimide), Carbodilite LA-1 (trade name) manufactured by Nisshinbo Chemical Inc. can be used.

The aromatic polycarbodiimide has an aromatic ring structure such as a benzene ring, and examples of such an aromatic polycarbodiimide include such polycarbodiimides in which the organic linking group R in the foregoing general formula includes at least a substituted or unsubstituted phenylene group. The substituent in the phenylene group is preferably an alkyl group having 1 to 6 carbon atoms, and more preferably an alkyl group having 1 to 4 carbon atoms. Examples of the alkyl group include a methyl group, an ethyl group, a propyl group (n-propyl group, isopropyl group), a butyl group (n-butyl group, isobutyl group, sec-butyl group, tert-butyl group), a linear or branched pentyl group, a linear or branched hexyl group and a cyclohexyl group. The phenylene group may have a plurality of substituents. As such an aromatic polycarbodiimide, commercially available products such as Stabaxol P (trade name, poly(1,3,5-triisopropylphenylene carbodiimide)) and Stabaxol P-100 (trade name) manufactured by Rhein Chemie Corp. can be used.

The carbodiimide compound (C) has a function to suppress the hydrolysis of the polylactic acid based resin, and can suppress the molecular weight decrease of the polylactic acid based resin (A) at the time of the resin composition production, for example, due to the phosphorus compound (b1) having a hydroxy group. Moreover, the carbodiimide compound (C) has a flame retardancy improvement effect. Through the carbodiimide compound (in particular, an aliphatic carbodiimide), the cross-linking structure between the polylactic acid based resin (A) and the phosphorus compound (b1) is partially formed, accordingly the compatibility between the polylactic acid based resin (A) and the phosphorus compound (b1) is improved, the dispersibility of the phosphorus compound (b1) in the polylactic acid based resin (A) is improved, and consequently the flame retardant effect is interpreted to be enhanced. Because of a higher flame retardant effect to be obtained, preferable is a polycarbodiimide having two or more carbodiimide groups.

Use of an aliphatic carbodiimide and an aromatic carbodiimide in combination allows the flame retardant effect to be more enhanced. This is probably because at a relatively high temperature, the re-cross-linking effect due to the aromatic carbodiimide is obtained, and thus the thermolysis rate of polylactic acid at a high temperature is reduced. As shown by the results of below-described Examples, the use of an aliphatic carbodiimide and an aromatic carbodiimide in combination as the carbodiimide compound (C) improves the flame retardancy, and on the contrary, the use of an aromatic carbodiimide alone does not improve the flame retardancy.

For the purpose of obtaining a sufficient flame retardancy improvement effect, the mixing amount of the carbodiimide compound (C), in relation to 100 parts by mass of polylactic acid (A), is set to be 0.1 part by mass or more, is preferably 0.5 part by mass or more and more preferably 1 part by mass or more; in particular, the mixing amount of the aliphatic carbodiimide, in relation to 100 parts by mass of polylactic acid (A), is set to be 0.1 part by mass or more, and is preferably 0.5 part by mass or more and more preferably 1 part by mass or more. When the aliphatic carbodiimide and the aromatic carbodiimide are used in combination, the mixing amount of the aromatic carbodiimide is preferably 0.1 part by mass or more, more preferably 0.5 part by mass or more and furthermore preferably 1 part by mass or more, for the purpose of obtaining a sufficient addition effect. The mixing ratio (mass ratio) between the aliphatic carbodiimide and the aromatic carbodiimide can be set to fall, for example, within a range from 1/9 to 9/1, is preferably set to fall within a range from 3/7 to 7/3 and can be set to fall within a range from 4/6 to 6/4. When the mixing amount of the carbodiimide compound (C) is too large, no effect corresponding to the addition amount is obtained, hence the mixing amount of the carbodiimide compound (C) can be set to be 20 parts by mass or less, and is preferably 10 parts by mass or less and more preferably 5 parts by mass or less, from the viewpoint of the moldability, the bleed resistance, the production cost and the like of the resin.

[Phosphazene Compound (b2)]

It is preferable to use the phosphazene compound (b2) as the flame retardant (B) in addition to the phosphorus compound (b1). The phosphazene compound (b2) is a compound having a double bond structure (N=P) of a nitrogen atom and a phosphorus atom, and is classified into a chain-like compound (polyphosphazene compound) and a cyclic compound (cyclophosphazene compound).

Examples of the chain-like polyphosphazene compound include the compound represented by the following general formula:

[Formula 5]

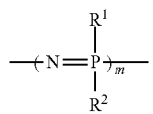

wherein in the formula, m represents an integer of 3 or more, and $R^1$ and $R^2$ each represent an organic group. In the formula, m preferably falls within a range from 3 to 1000; for example, a polyphosphazene compound having m falling within a range from 3 to 100 can be used, and moreover, a polyphosphazene compound having m falling within a range from 3 to 50 can be used. The polyphosphazene compound can have, as each of $R^1$ and $R^2$, for example, a substituted or unsubstituted phenoxy group or a substituted or unsubstituted naphthoxy group, with the proviso that $R^1$ and $R^2$ are independent of each other. Examples of the substituent in the phenoxy group and the substituent in the naphthoxy group include an alkyl group having 1 to 4 carbon atoms, an allyl group, a cyano group and an amino group.

Examples of the cyclic cyclophosphazene compound include the cyclic compound represented by the following general formula:

[Formula 6]

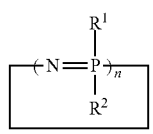

wherein in the formula, n represents an integer of 3 or more, and $R^1$ and $R^2$ each represent an organic group. In the formula, n preferably falls within a range from 3 to 25 and for example, more preferably falls within a range from 3 to 5. The cyclopolyphosphazene compound can have, as each of $R^1$ and $R^2$, for example, a substituted or unsubstituted phenoxyl group or a substituted or unsubstituted naphthoxy group (β-naphthoxy gruop), with the proviso that $R^1$ and $R^2$ are independent of each other. Examples of the substituent in the phenoxy group and the substituent in the naphthoxy group include an alkyl group having 1 to 4 carbon atoms, an allyl group, a cyano group and an amino group. As the cyclophosphazene compound having the phenoxy group having a substituent, for example, a cyclophosphazene compound having a 4-cyanophenoxy group or 4-aminophenoxy can be used.

Examples of such a cyclophosphazene compound include a cyclophosphazene compound having a phenoxy group, a cyclophosphazene compound having a cyanophenoxy group, a cyclophosphazene compound having an aminophenoxy group, a cyclophosphazene compound having a substituted or unsubstituted naphthoxy group and a cyclophosphazene compound having a phenolic hydroxyl group; one of these or mixtures of two or more of these can be used. The phenolic hydroxyl group tends to form a quinone structure to be a cause for coloration when the phenolic hydroxyl group is oxidized, and hence it is preferable for the cyclophosphazene compound not to include a phenolic hydroxyl group. In other words, from the viewpoint of the resistance to discoloration, the cyclophosphazene compound is preferably at least a compound selected from the group consisting of the cyclophosphazene compound having a phenoxy group, the cyclophosphazene compound having a cyanophenoxy group, the cyclophosphazene compound having an aminophenoxy group and the cyclophosphazene compound having a substituted or unsubstituted naphthoxy group. As such a cyclophosphazene compound, a cyclotriphosphazene, a cyclotetraphosphazene or a cyclopentaphosphazene having a substituted or unsubstituted phenoxy group or a substituted or unsubstituted naphthoxy group is preferable, and the cyclotriphosphazene having a substituted or unsubstituted phenoxy group can be preferably used. Examples of such a cyclophosphazene compound include hexaphenoxycyclotriphosphazene (the phenoxy group may have a substituent).

For the purpose of obtaining a flame retardancy improvement effect corresponding to the addition, the mixing amount of the phosphazene compound (b2), in relation to 100 parts by mass of polylactic acid resin, is preferably 1 part by mass or more, more preferably 2 parts by mass or more and furthermore preferably 3 parts by mass or more. On the other hand, from the viewpoint of the bleed resistance, the mixing amount of the phosphazene compound (b2), in relation to 100 parts by mass of polylactic acid resin, is preferably 30 parts by mass or less and more preferably 20 parts by mass or less, and further preferably 10 parts by mass or less, and may be set to be 7 parts by mass or less.

As compared to the case where the phosphorus compound (b1) is used alone as the phosphorus-based flame retardant, the use of the phosphorus compound (b1) and the phosphazene compound (b2) in combination allows the dilution of flammable gas to be performed over a wide temperature range, and hence achieves a higher flame retardant effect. The phosphazene compound (b2) has a melting point and has a low compatibility with polylactic acid, and hence is melted at the time of a relatively low temperature before the melting and decomposition of polylactic acid; consequently, the compound (b2) is concentrated on the surface of the resin composition and evaporated (or partially decomposed) to generate phosphorus-derived nonflammable gas. On the other hand, the phosphorus compound (b1) (phosphaphenanthrene-based compound) has no melting point and has a low compatibility with polylactic acid, and hence is sublimed (or partially decomposed) at the time of a relatively high temperature equal to or higher than the decomposition temperature of polylactic acid to generate phosphorus-derived nonflammable gas. In this way, over a wide temperature range, nonflammable gas is generated to dilute the amount of the flammable gas, and hence a higher flame retardant effect is obtained.

[Metal Hydroxide (b3)]

It is preferable to use a metal hydroxide (b3) as the flame retardant (B) in addition to the phosphorus compound (b1).

Examples of the metal hydroxide (b3) include aluminum hydroxide, magnesium hydroxide, dawsonite, calcium aluminate hydrate, hydrated plaster, calcium hydroxide, zinc borate, barium metaborate, borax and kaolinite. Among these, one or a mixture of two or more selected from aluminum hydroxide, magnesium hydroxide and calcium hydroxide is preferable, and aluminum hydroxide is more preferable.

In the metal hydroxide (b3), from the viewpoint of suppression of the hydrolysis of the phosphorus-based compound or polylactic acid based resin (A), the content of the alkali metal-based material and alkaline earth metals is preferably 0.2% by mass or less. Examples of the alkali metal-based material and the alkaline earth metal included in the metal hydroxide (b3) include: salts such as oxides or chlorides of alkali metals such as lithium, sodium and potassium, and such as oxides or chlorides of alkaline earth metals such as beryllium, magnesium, calcium, strontium and barium. The content of the alkali metal-based material can be measured by atomic absorption analysis or ICP emission spectrochemical analysis.

The metal hydroxide (b3) is composed of preferably a granular material having an average particle size of 10 μm or less and more preferably a granular material having an average particle size of 0.1 to 5 μm. The average particle size of the metal hydroxide (b3) can be determined by measuring the volume-based median diameter by a diffraction scattering method. Such a measurement can be performed by using a commercially available measurement apparatus such as the laser diffraction particle size distribution analyzer SALD-3100 (trade name) manufactured by Shimadzu Corp.

The metal hydroxide (b3) can also be used under the condition that the metal hydroxide (b3) is subjected to a surface treatment with a silane coupling agent. A method for performing the surface treatment of the metal hydroxide (b3) with a silane coupling agent is not particularly limited; examples of such a method include a method in which a solution prepared by dissolving the silane coupling agent in a solvent such as acetone, ethyl acetate or toluene is sprayed or applied on the surface of the metal hydroxide (b3), and then the metal hydroxide (b3) is dried to remove the solvent.

The addition of the metal hydroxide (b3) can enhance the flame retardancy. Such a flame retardancy improvement effect is probably ascribable to the heat absorption at the time of the thermolysis of the metal hydroxide (b3) and the heat absorption and the dilution effect of the flammable gas due to the water generated at the time of the thermolysis. The addition of the metal hydroxide (b3) does not disturb the foregoing dilution effect of the flammable gas due to the phosphorus compound (b1) and the phosphazene compound (b2).

The mixing amount of the metal hydroxide (b3) in relation to 100 parts by mass of the polylactic acid based resin (A) can be set to fall within a range from 30 to 150 parts by mass in terms of the total amount of the metal hydroxide (b3), the phosphorus compound (b1) and the phosphazene compound (b2). From the viewpoint of obtaining a sufficient addition effect of the metal hydroxide (b3), the content of the metal hydroxide (b3) is preferably 10 parts by mass or more, more preferably 15 parts by mass or more and furthermore preferably 20 parts by mass or more; from the viewpoint of sufficiently ensuring the fluidity and the mechanical strength of the polylactic acid based resin (A), the content of the metal hydroxide (b3) is preferably 200 parts by mass or less, more preferably 150 parts by mass or less and furthermore preferably 100 parts by mass or less; even with the content of the metal hydroxide (b3) of 70 parts by mass or less, a sufficient flame retardancy improvement effect can be obtained.

[Fiber (D)]

The polylactic acid based resin according to the exemplary embodiment of the present invention may include fiber such as inorganic fiber, organic synthetic fiber or plant-derived natural fiber. From the viewpoint of heat resistance, inorganic fiber is preferable; examples of the inorganic fiber include inorganic fibers such as a metal fiber, a glass fiber, a metal silicate fiber, an inorganic oxide fiber and an inorganic nitride fiber. These fibers may be used each alone or as mixtures of two or more thereof. Mixtures of two or more of an inorganic fiber, an organic synthetic fiber and a plant-derived natural fiber may also be used; at least an inorganic fiber is preferably included. The inclusion of the fiber allows the heat distortion prevention effect and the drip-suppression effect of the molded article to be obtained.

The shape of the fiber may be such that the cross-section of the fiber is circular, or such that it is polygonal, or of an indeterminate shape or a shape having asperities. From the viewpoint of increasing the junction area with the resin, the shape of the fiber is preferably a high-aspect-ratio shape having asperities or a shape having a small fiber diameter.

The fiber may be subjected, if necessary, to a surface treatment for the purpose of enhancing the affinity with the resin to be the base material, and the entanglement between fibers. As the surface treatment method, a treatment with a coupling agent such as a silane-based or titanate-based coupling agent, an ozone treatment, a plasma treatment, and a treatment with an alkyl phosphate-type surfactant are effective. However, the surface treatment method is not limited to these methods, and it is possible to use such a treatment method that can be usually used for the surface modification of a filler.

The average fiber length (number average fiber length of the fiber exclusive of fiber fragments) of the fiber preferably falls within a range from 0.1 mm to 20 mm and more preferably within a range from 0.1 to 10 mm. It is also preferable to include fiber having a fiber length of 300 μm to 20 mm.

The content of the fiber is not particularly limited; however, for the purpose of obtaining a sufficient addition effect, with reference to the whole polylactic acid based resin, the content of the fiber is preferably 1% by mass or more and preferably 3% by mass or more; for the purpose of sufficiently ensuring the moldability and the mechanical strength of the resin composition, with reference to the whole polylactic acid based resin, the content of the fiber is preferably 50% by mass or less and more preferably 30% by mass or less, and can be set to be, for example, 1% by mass or more and 10% by mass or less.

[Fluorine-Containing Resin (E)]

A fluorine-containing resin may be included in the polylactic acid based resin composition according to the exemplary embodiment of the present invention. The inclusion of a fluorine-containing resin composition can enhance the drip resistance.

The fluorine-containing resin is preferably of a fiber-forming type (a type forming a fibril-like structure); examples of such a fluorine-containing resin include: fluorinated polyethylenes such as polytetrafluoroethylene; and tetrafluoroethylene-based copolymers (such as tetrafluoroethylene/hexafluoropropylene copolymer).

For the purpose of obtaining a sufficient addition effect, the content of the fluorine-containing resin with reference to the whole polylactic acid based resin is preferably 0.05% by mass or more and more preferably 0.1% by mass or more. On the other hand, from the viewpoint of the production (granulation) and the like of the resin composition, the content of the fluorine-containing resin is preferably 5% by mass or less and more preferably 1% by mass or less.

[Crystal Nucleating Agent]

The polylactic acid based resin composition according to the exemplary embodiment of the present invention may further include a crystal nucleating agent. The inclusion of the crystal nucleating agent can improve the crystallization rate of the polylactic acid based resin. As the crystal nucleating agent, either an inorganic crystal nucleating agent or an organic crystal nucleating agent can be used.

Examples of the inorganic crystal nucleating agent include: talc, calcium carbonate, mica, boron nitride, synthetic silicic acid, silicate, silica, kaolin, carbon black, zinc oxide, montmorillonite, clay minerals, basic magnesium carbonate, quartz powder, glass fiber, glass powder, diatom earth, dolomite power, titanium oxide, zinc oxide, antimony oxide, barium sulfate, calcium sulfate, alumina, calcium silicate and boron nitride.

Examples of the organic crystal nucleating agent include: organic carboxylic acids such as octylic acid, toluic acid, heptanoic acid, pelargonic acid, lauric acid, myristic acid, palmitic acid, stearic acid, behenic acid, cerotic acid, montanic acid, mellis sic acid, benzoic acid, p-tert-butylbenzoic acid, terephthalic acid, terephthalic acid monomethyl ester, isoterephthalic acid, isoterephthalic acid monomethyl ester, rosin acid, 12-hydroxystearic acid and cholic acid; alkali (earth) metal salts of organic carboxylic acids such as the alkali (earth) metal salts of the foregoing organic carboxylic acids; and polymer organic compounds having metal salts of carboxyl groups such as metal salts of carboxyl group-containing polyethylene obtained by oxidation of polyethylene, metal salts of carboxyl group-containing polypropylene obtained by oxidation of polypropylene, metal salts of the copolymers between the olefins such as ethylene, propylene and butene-1 and acrylic acid or methacrylic acid, metal salts of the copolymers between styrene and acrylic acid or methacrylic acid, metal salts of the copolymers between the olefins and maleic anhydride and metal slats of the copolymers between styrene and maleic anhydride.

Examples of the amide-based or urea-based organic crystal nucleating agent include: aliphatic carboxylic acid amides such as oleic acid amide, stearic acid amide, erucic acid amide, behenic acid amide, N-oleyl palmitamide, N-stearyl erucic acid amide, N,N'-ethylenebis(stearamide), ethylenebis-12-hydroxystearic acid amide, hexamethylenebis-10-hydroxystearic acid amide, hexamethylenebis-9,10-dihydroxystearic acid amide, p-xylylenebis-11,12-dihydroxystearic acid amide, p-xylylenebis-9,10-dihydroxystearic acid amide, N,N'-methylenebis (stearamide), methylol stearamide, ethylenebisoleic acid amide, ethylenebisbehenic acid amide, ethylenebissteraic acid amide, ethylenebislauric acid amide, hexamethylenebisoleic acid amide, hexamethylenebisstearic acid amide, butylenebisstearic acid amide, N,N'-dioleyl sebacic acid amide, N,N'-dioleyl adipic acid amide, N,N'-distearyladipic acid amide, N,N'-distearylsebacic acid amide, m-xylylenebisstearic acid amide, N,N'-distearylisophthalic acid amide, N,N'-distearylterephthalic acid amide, N-oleyloleic acid amide, N-stearyloleic acid amide, N-stearylerucic acid amide, N-oleylstearic acid amide, N-stearylstearic acid amide, dimethytol oil amide, dimethyllauric acid amide, dimethylstearic acid amide, N,N'-cyclohexanebis(stearamide) and N-lauroyl-L-glutamic acid-α,γ-n-butylamide; and urea compounds such as N-butyl-N'-stearyl urea, N-propyl-N'-stearyl urea, N-allyl-N'-stearyl urea, N-phenyl-N'-stearyl urea and N-stearyl-N'-stearyl urea.

Examples of the organic crystal nucleating agent composed of a polymer compound include: polymers of α-olefins branched at position 3 having 5 or more carbon atoms such as 3,3-dimethylbutene-1,3-methylbutene-1,3-methylpentene-1, 3-methylhexene-1,3,5,5-trimethylhexene-1; polymers of vinylcycloalkanes such as vinylcyclopentane, vinylcyclohexane and vinylnorbornane; polyalkylene glycols such as polyethylene glycol and polypropylene glycol; polyglycolic acid; cellulose-based compounds such as cellulose, cellulose ester and cellulose ether; polyester; and polycarbonate.

Examples of the organic crystal nucleating agent composed of a phosphorus-based compound include phosphoric acid or phosphorous acid based organic compounds and the metal salts thereof such as diphenyl phosphate, diphenyl phosphite, sodium bis(4-tert-butylphenyl)phosphate and sodium methylene(2,4-tert-butylphenyl)phosphate.

Examples of other organic crystal nucleating agents include: sorbitol derivatives such as bis(p-methylbenzylidene)sorbitol and bis(p-ethylbenzylidene)sorbitol; cholesterol derivatives such as cholesteryl stearate and cholesteryloxystearamide; thioglycolic anhydride; and toluenesulfonic acid based compounds such as paratoluenesulfonic acid, paratoluenesulfonic acid amide and metal salts of these.

Heretofore known crystal nucleating agents other than these crystal nucleating agents can also be used. One of the inorganic crystal nucleating agents and one of the organic crystal nucleating agents may be used in combination, or a plurality of crystal nucleating agents selected from the crystal nucleating agents may also be used in combination.

In the polylactic acid based resin composition according to the exemplary embodiment of the present invention, the content of the crystal nucleating agent is not particularly limited; however, for example, the content of the crystal nucleating agent can be appropriately set within a range from 0.1 to 20 parts by mass in relation to 100 parts by mass of the polylactic acid based resin.

[Crystallization Promoting Aid]

In the polylactic acid based resin composition according to the exemplary embodiment of the present invention, a plasticizer may be included as a crystallization promoting agent to improve the crystallization rate of the polylactic acid based resin. The addition of the crystallization promoting agent enables the flexibility of the polylactic acid based resin to be maintained even at relatively low temperatures, and hence the crystallization proceeds in a relatively short period of time and thus a satisfactory molding can be performed.

Examples of such a crystallization promoting agent include: an ester from acetic acid and an ethylene oxide adduct of glycerin having an average 3 to 6 moles of ethylene oxide per mole of glycerin; an ester from acetic acid and polyethylene glycol having an average ethylene oxide-adduct molar number of 4 to 6; an ester from succinic acid and polyethylene glycol monomethyl ether having an average ethylene oxide-adduct molar number of 2 to 3; an ester from adipic acid and diethylene glycol monomethyl ether; and an ester from 1,3,6-hexanetricarboxylic acid and diethylene glycol monomethyl ether.

[Other Components]

In the polylactic acid resin composition according to the exemplary embodiment of the present invention, an antioxidant such as a hindered phenol or a phosphite-based compound, or a lubricant such as a hydrocarbon-based wax or an anionic surfactant may be included. The content of each of the antioxidant and the lubricant is preferably 0.05 to 3 parts by mass and more preferably 0.1 to 2 parts by mass in relation to 100 parts by mass of the polylactic acid based resin.

The polylactic acid resin composition according to the exemplary embodiment of the present invention can include, if necessary, an antistatic agent, an anticlouding agent, a light stabilizer, an ultraviolet absorber, a pigment, an antimold agent, an antibacterial agent, a foaming agent, a heat stabilizer, an antiweathering agent, a release agent and a filler, each within a range not impairing the intended effects according to the object of the present invention.

[Method for Producing Polylactic Acid Based Resin Composition]

There is no particular limit on the method for mixing the various mixed components in the polylactic acid based resin composition according to the exemplary embodiment of the present invention; examples of the mixing method include: mixing with heretofore known mixing machines such as a tumbler, a ribbon blender, and a single screw or twin screw kneader; and melt mixing with an extruder or a roll.

When the metal hydroxide (b3) or fiber is mixed into the composition, it is preferable to directly add it to the molten polylactic acid based resin or the polylactic acid based resin before melting.

[Polylactic Acid Based Resin Molded Article and Production Method Thereof]

By a production method according to an exemplary embodiment using the foregoing polylactic acid based resin composition of the above-described exemplary embodiment, it is possible to obtain by injection molding, film molding, blow molding or foam molding, molded articles suitable for applications to electric and electronic devices such as enclosures of electrical appliances, and applications to building materials, automobile components, daily commodities, medical care, agriculture and toys and amusement goods.

The shape and the sizes such as thickness, length and height of the molded article according to the exemplary embodiment of the present invention are not particularly limited; the molded article of the exemplary embodiment can be processed into various molded products such as injection molded products, extrusion molded products, compression molded products, blow molded products, sheet, film, yarn and fabric. Specifically, examples of such molded products include housings of electric/electronic appliances, films for packaging products, various types of containers and automobile components. When the molded article according to the exemplary embodiment of the present invention is used as a sheet, the molded article may be used as a laminate of multilayered structure obtained by laminating the sheet and paper or other polymer sheets.

The method for molding the polylactic acid based resin composition according to the exemplary embodiment of the present invention is not particularly limited; it is possible to use heretofore known molding methods usually used for production of various products such as electric and electronic device products, for example, injection molding, injection-compression molding and compression molding.

The temperature at the time of melt-mixing the mixed components of the polylactic acid based resin composition or molding the composition can be appropriately set within a range such that the temperature is equal to or higher than the melting temperature of the resin to be the base material and the polylactic acid based resin and the additive components are not thermally degraded.

The polylactic acid based resin composition according to the exemplary embodiment of the present invention allows the heat distortion temperature or the strength of the molded article to be increased through the promotion of the crystallization. For the purpose of the promotion of the crystallization, it is preferable to maintain the polylactic acid based resin composition at a temperature equal to or higher than the glass transition temperature Tg (° C.) of the polylactic acid based resin (A) and equal to or lower than the temperature lower by 20° C. than the melding point Tm (° C.) of the polylactic acid based resin (A), in the cooling process at the time of molding or after the molding.

For example, at the time of injection molding, the cooling in the mold allows the crystallization to be promoted. In this case, it is preferable to maintain the mold temperature at Tg or higher and (Tm—20)° C. or lower for a predetermined period of time. It is more preferable to cool the mold temperature down to Tg or lower after the mold temperature is maintained at Tg or higher and (Tm—20)° C. or lower for a predetermined period of time.

On the other hand, it is possible to promote the crystallization by performing a heat treatment after molding. In this case, it is preferable to heat treat the molded article cooled to Tg or lower at Tg or higher and (Tm—20)° C. or lower.

EXAMPLES

Hereinafter, the present invention is further described with reference to Examples.

(1) Preparation of Resin Composition

The materials prepared according to the components and the mixing proportions of each of Examples and Comparative Examples shown in Table 1 were melt-mixed at a kneading temperature of 190±2° C. by using a kneader (S1 kneader, manufactured by Kurimoto, Ltd.) to yield a pellet made of a polylactic acid based resin composition.

(2) Preparation of Molded Article for Evaluation (Specimen)

The obtained pellet was dried at 100° C. for 4 hours or more, then a molding was performed by using an injection molding machine (EC20P-0.4A, manufactured by Toshiba Machine Co., Ltd.), at a cylinder temperature of 190° C. and at a mold temperature of 30° C., to yield a 3.2-mm thick specimen (length: 125±5 mm, width: 13±0.5 mm, thickness: 3.2±0.5 mm) and a 1.6-mm thick specimen (length: 125±5 mm, width: 13±0.5 mm, thickness: 1.6±0.5 mm). These specimens were heat treated in a constant temperature room set at 100° C. for 4 hours or more, then the temperatures of the specimens were brought back to room temperature, and thereafter the specimens were used as the molded articles for evaluation of flame retardancy.

(3) Flame Retardancy Evaluation Test

A burning test was performed for the specimens prepared by the aforementioned method on the basis of the safety standard UL94 of Underwriters Laboratories LLC. The test results were determined as V-0, V-1, V-2 and Not in the decreasing order of the flame retardancy. The test results thus obtained are shown in Table 1.

The burning test was performed with sets each composed of five specimens. Each of the specimens in a set was vertically supported, a burner flame was brought into contact with the lower end of the specimen, the contact of the burner flame was maintained for 10 seconds, then the burner flame was separated from the specimen. If the flame was extinguished, the burner flame was further brought into contact with the lower end of the specimen for 10 seconds, and then the burner flame was separated from the specimen.

times (afterflame times) of the five specimens, and the occurrence/non-occurrence of the ignition of cotton by the burning drippings (drips).

V-0: Both t1 and t2 were within 10 seconds; t2+t3 was within 30 seconds; T was within 50 seconds; no ignition of cotton by drips occurred; and no burnout occurred.

V-1: Both t1 and t2 were within 30 seconds; t2+t3 was within 60 seconds; T was within 250 seconds; no ignition of cotton by drips occurred; and no burnout occurred.

V-2: Both t1 and t2 were within 30 seconds; t2+t3 was within 60 seconds; T was within 250 seconds; the ignition of cotton by drips occurred; and no burnout occurred.

Not: None of V-0, V-1 and V-2 is applicable.

The evaluation of the dripping property is as follows.

○: No ignition of cotton by drips occurred in any one of the five specimens.

Δ: The ignition of cotton by drips occurred in one to two of the five specimens.

x: The ignition of cotton by drips occurred in three to five of the five specimens.

(4) Bleed Resistance Evaluation Test

Each of the 1.6-mm thick specimens prepared by the aforementioned method was stored in a constant temperature and constant humidity chamber set at 60° C. and 95 RH % for 60 hours, and then the occurrence or non-occurrence of the components exuded (precipitates) on the surface of the molded article was observed with an optical microscope, and the bleed resistance was evaluated as follows.

○: No precipitates were observed on the surface of the specimen.

x: One or more 5 μm×5 μm or larger precipitates were observed on the surface of the specimen.

TABLE 1

|  |  | Examples | | | | | | | Comparative Examples | | | | | | |
| --- | --- | --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 | 6 | 7 |
| Mixing proportions | Polylactic acid (A) (parts by mass) | 100 | 100 | 100 | 100 | 100 | 100 | 100 | 100 | 100 | 100 | 100 | 100 | 100 | 100 |
|  | Phosphorus compound 1 (b1) (parts by mass) | 30 | 25 | 5 | 35 | 35 | 10 | 35 | 30 | 30 | — | — | — | — | — |
|  | Phosphorus compound 2 (parts by mass) | — | — | — | — | — | — | — | — | — | — | 25 | — | 35 | 10 |
|  | Phosphorus compound 3 (parts by mass) | — | — | — | — | — | — | — | — | — | — | — | 25 | — | — |
|  | Phosphazene compound (b2) (parts by mass) | — | 5 | 5 | 5 | 5 | 5 | 5 | — | — | 5 | 5 | 5 | 5 | 5 |
|  | Aluminum hydroxide (b3) (parts by mass) | — | — | 20 | 40 | 40 | 65 | 40 | — | — | 25 | — | — | 40 | 65 |
|  | Aliphatic carbodiimide (C1) (parts by mass) | 2 | 2 | 2 | 2 | 1 | 1 | 1 | — | — | 2 | 2 | 2 | 1 | 1 |
|  | Aromatic carbodiimide (C2) (parts by mass) | — | — | — | — | 1 | 1 | 1 | — | 2 | — | — | — | 1 | 1 |
|  | Glass fiber (D) (% by mass) | 5 | 5 | 5 | 5 | 5 | 5 | — | 5 | 5 | 5 | 5 | 5 | 5 | 5 |
|  | Fluorinated polyethylene (E) (% by mass) | 0.3 | 0.3 | 0.3 | 0.3 | 0.3 | 0.3 | 0.3 | 0.3 | 0.3 | 0.3 | 0.3 | 0.3 | 0.3 | 0.3 |
| Evaluation results | Flame retardancy at 3.2 mm thickness | V-1 | V-0 | V-0 | V-0 | V-0 | V-0 | V-0 | Not | Not | Not | V-1 | V-2 | V-1 | V-1 |
|  | Drip resistance at 3.2 mm thickness | ○ | ○ | ○ | ○ | ○ | ○ | ○ | x | x | Δ | ○ | x | ○ | ○ |
|  | Flame retardancy at 1.6 mm thickness | Not | Not | Not | V-1 | V-0 | V-0 | V-0 | Not | Not | Not | Not | Not | V-1 | V-1 |
|  | Drip resistance at 1.6 mm thickness | Δ | Δ | Δ | ○ | ○ | ○ | ○ | x | x | x | x | x | ○ | ○ |
|  | Bleed resistance | ○ | ○ | ○ | ○ | ○ | ○ | ○ | ○ | ○ | ○ | x | ○ | x | x |

The evaluation of V-0, V-1 and V-2 was performed in terms of the following items: the flame burning duration time after the completion of the first flame contact (the first afterflame time: t1), the flame burning duration time after the completion of the second flame contact (the second afterflame time: t2), the sum (t2+t3) of the flame burning duration time after the completion of the second flame contact (the second afterflame time: t2) and the flameless burning duration time (afterglow time: t3), the sum (T) of the flame burning duration The components in the table are as follows.

Polylactic acid (A): Trade name: TE4000, manufactured by Unitika Ltd.

Phosphorus compound 1 (b1): 9,10-Dihydro-10-(2,5-dihydroxyphenyl)-9-oxa-10-phosphaphenanthrene-10-oxide (trade name: HCA-HQ, manufactured by Sanko Co., Ltd.)

Phosphorus compound 2: 9,10-Dihydro-10-benzyl-9-oxa-10-phosphaphenanthrene-10-oxide (trade name: SANKO-BCA, manufactured by Sanko Co., Ltd.)

Phosphorus compound 3: Aromatic condensed phosphoric acid ester (trade name: PX-200, manufactured by Daihachi Chemical Industry Co., Ltd.)

Phosphazene compound (b2): Phenoxycyclophosphazene (trade name: SPS-100, structural formula: [N=P(OC$_6$H$_5$)$_2$]$_3$), manufactured by Otsuka Chemical Co., Ltd.)

Aluminum hydroxide (b3): Trade name: HP350, average particle size: 5 μm, manufactured by Showa Denko K. K.

Aliphatic carbodiimide (C1): Trade name: Carbodilite LA-1, manufactured by Nisshinbo Chemical Inc.

Aromatic carbodiimide (C2): Trade name: Stabaxol P, manufactured by Rhein Chemie Corp.

Glass fiber (D): Trade name: CSO3JAFT592, fiber diameter: 13 μm, fiber length: 3 mm, manufactured by Owens Corning Corp.

Fluorinated polyethylene (E): Trade name: FA500, manufactured by Daikin Industries, Ltd.

In the table, the contents of the glass fiber (D) and the fluorinated polyethylene (E) are represented by the contents (% by mass) in relation to the whole polylactic acid based resin composition, and the contents of the other components are represented in parts by mass in relation to 100 parts by mass of the polylactic acid (A).

As can be seen from a comparison of Example 1 with Comparative Examples 1 and 2, the addition of the specific phosphorus compound 1 (b1) having a phosphaphenanthrene skeleton and a hydroxy group and the aliphatic carbodiimide compound (C1) to the polylactic acid (A) provides heat resistance and at the same time, can improve the flame retardancy.

As in Example 2, the addition of the phosphazene compound (b2) can more improve the flame retardancy.

In Comparative Example 4, the phosphorus compound 2 having a phosphaphenanthrene skeleton but no hydroxy group was added, and the bleed resistance and the flame retardancy are both low. In Comparative Example 5, the phosphorus compound 3 having a hydroxy group but no phosphaphenanthrene skeleton was added, and the flame retardancy is low. As can be seen from these results, the use of the phosphorus compound (b1) having both of a phosphaphenanthrene skeleton and a hydroxy group makes it possible to establish a compatibility between a high flame retardancy and the bleed resistance.

As can be seen from a comparison of Example 3 with Comparative Example 3, in contrast to the resin composition (Comparative Example 3) low in flame retardancy because aluminum hydroxide (b3) was added but the addition amount was small, the inclusion of a small amount of the specific phosphorus compound (b1) having both of a phenanthrene skeleton and a hydroxy group (Example 3) improves the flame retardancy. As can also be seen from a comparison between Example 3 and Example 4, an appropriate regulation of the mixing amounts of the specific phosphorus compound 1 (b1) and aluminum hydroxide (b3) allows the flame retardancy to be further improved.

As can be seen from a comparison between Example 4 and Example 5, the use of the aliphatic carbodiimide (C1) and the aromatic carbodiimide (C2) in combination as the carbodiimide compound (C) allows the flame retardancy to be further improved. As can be seen from a comparison of Examples 5 and 6 with Comparative Examples 6 and 7, such a high flame retardancy can be obtained only in the presence of the specific phosphorus compound 1 (b1).

As described above, according to the exemplary embodiment of the present invention, the polylactic acid based resin composition is made to include a hardly-bleeding flame retardant component, and hence it is not necessary to use a common phosphorus-based flame retardant which is likely to bleed; even if the common phosphorus-based flame retardant is used, the used amount thereof can be suppressed; and consequently, a flame-retardant resin composition excellent in bleed resistance can be obtained.

Moreover, according to the exemplary embodiment of the present invention, the polylactic acid based resin composition is made to include a component highly enhancing the flame retardancy, and hence it is not necessary to use a metal hydroxide as a flame retardant; even if the metal hydroxide is used, the used amount of the metal hydroxide can be suppressed; and consequently, a flame-retardant resin composition excellent in fluidity can be obtained.

While the present invention has been described with reference to the exemplary embodiments, the present invention is not limited to the above exemplary embodiments. Various changes that can be understood by those skilled in the art may be made to the constitution and details of the present invention within the scope thereof.

This application claims the right of priority based on Japanese Patent Application No. 2010-077915, filed on Mar. 30, 2010, the entire content of which is incorporated herein by reference.

The invention claimed is:

1. A flame-retardant polylactic acid based resin composition comprising:
    100 parts by mass of a polylactic acid based resin (A);
    30 to 300 parts by mass of a flame retardant (B);
    0.1 to 20 parts by mass of a carbodiimide compound (C);
    0 to 100 parts by mass of fiber; and
    0 to 5 parts by mass of a fluorine-containing resin,
    wherein the flame retardant (B) comprises one or two or more components selected from a group consisting of a phosphorus compound (b1) having a phosphaphenanthrene skeleton and a hydroxy group, a phosphazene compound (b2) and a metal hydroxide (b3), the flame retardant (B) comprising at least 1 part by mass or more of the phosphorus compound (b1); and
    the carbodiimide compound (C) comprises at least 0.1 part by mass or more of an aliphatic carbodiimide, and
    wherein the flame-retardant polylactic acid based resin composition further comprises 0.1 part by mass or more of an aromatic carbodiimide as the carbodiimide compound (C).

2. The flame-retardant polylactic acid based resin composition according to claim 1, comprising 1 to 30 parts by mass of the phosphazene compound (b2).

3. The flame-retardant polylactic acid based resin composition according to claim 1, comprising 10 parts by mass or more of the metal hydroxide (b3).

4. The flame-retardant polylactic acid based resin composition according to claim 1, wherein the phosphorus compound (b1) is a compound represented by the following formula (1):

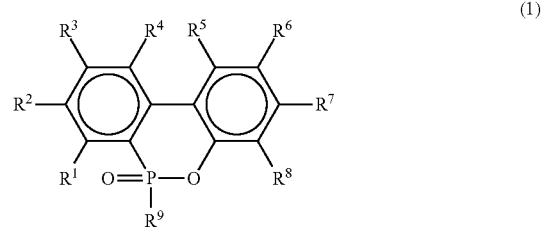

wherein in formula (1), $R^1$ to $R^9$ represent each independently a hydrogen atom, a hydroxy group, an alkyl group, an alkenyl group, an aryl group or an aralkyl group, and at least one of $R^1$ to $R^9$ is a hydroxy group or a substituent having a hydroxy group.

5. The flame-retardant polylactic acid based resin composition according to claim 4, wherein the phosphorus compound (b1) is a compound represented by formula (1) wherein $R^1$ to $R^8$ are each a hydrogen atom and $R^9$ is an aryl group having a hydroxy group.

6. The flame-retardant polylactic acid based resin composition according to claim 5, wherein the phosphorus compound (b1) is a compound represented by formula (1) wherein $R^9$ is 2,5-dihydroxyphenyl.

7. The flame-retardant polylactic acid based resin composition according to claim 1, wherein the aliphatic carbodiimide is an aliphatic polycarbodiimide.

8. The flame-retardant polylactic acid based resin composition according to claim 7, wherein the aliphatic polycarbodiimide has an alicyclic structure.

9. The flame-retardant polylactic acid based resin composition according to claim 1, wherein the aromatic carbodiimide is an aromatic polycarbodiimide.

10. The flame-retardant polylactic acid based resin composition according to claim 1, comprising a cyclophosphazene compound as the phosphazene compound (b2).

11. The flame-retardant polylactic acid based resin composition according to claim 10, wherein the cyclophosphazene compound has a substituted or unsubstituted phenoxy group.

12. The flame-retardant polylactic acid based resin composition according to claim 1, comprising aluminum hydroxide as the metal hydroxide (b3).

13. A molded article obtained by molding the flame-retardant polylactic acid based resin composition according to claim 1.

14. A flame-retardant polylactic acid based resin composition, comprising:
100 parts by mass of a polylactic acid based resin (A);
30 to 300 parts by mass of a flame retardant (B);
0.1 to 20 parts by mass of a carbodiimide compound (C);
0 to 100 parts by mass of fiber; and
0 to 5 parts by mass of a fluorine-containing resin,
wherein the flame retardant (B) comprises one or two or more components selected from a group consisting of a phosphorus compound (b1) having a phosphaphenanthrene skeleton and a hydroxy group, a phosphazene compound (b2) and a metal hydroxide (b3), the flame retardant (B) comprising at least 1 part by mass or more of the phosphorus compound (b1); and
the carbodiimide compound (C) comprises at least 0.1 part by mass or more of an aliphatic carbodiimide, and
wherein the phosphorus compound (b1) is a compound represented by the following formula (1):

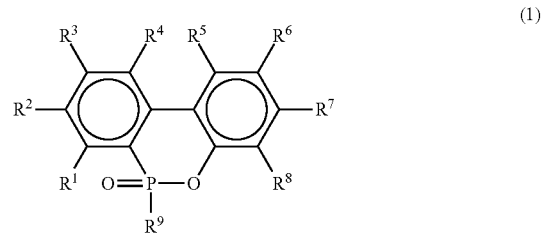

(1)

wherein in formula (1), $R^1$ to $R^9$ represent each independently a hydrogen atom, a hydroxy group, an alkyl group, an alkenyl group, an aryl group or an aralkyl group, and at least one of $R^1$ to $R^9$ is a hydroxy group or a substituent having a hydroxy group, and wherein the flame-retardant polylactic acid based resin composition further comprises 0.1 part by mass or more of an aromatic carbodiimide as the carbodiimide compound (C), and wherein the phosphorus compound (b1) is a compound represented by formula (1) wherein $R^1$ to $R^8$ are each a hydrogen atom and $R^9$ is an aryl group having a hydroxy group, and wherein the aromatic carbodiimide is an aromatic polycarbodiimide.

15. The flame-retardant polylactic acid based resin composition according to claim 14, wherein the aliphatic carbodiimide is an aliphatic polycarbodiimide.

16. The flame-retardant polylactic acid based resin composition according to claim 15, wherein the aliphatic polycarbodiimide has an alicyclic structure.

17. The flame-retardant polylactic acid based resin composition according to claim 9, wherein the aliphatic carbodiimide is an aliphatic polycarbodiimide.

18. The flame-retardant polylactic acid based resin composition according to claim 17, wherein the aliphatic polycarbodiimide has an alicyclic structure.

* * * * *